Dec. 22, 1970  H. S. BRYANT, JR., ET AL  3,549,695
METHOD FOR DOWNFLOW LEACHING
Filed Sept. 1, 1966  2 Sheets-Sheet 1

Inventors
Howard S. Bryant, Jr.
John Nasser
By James F. Snowden
Attorney

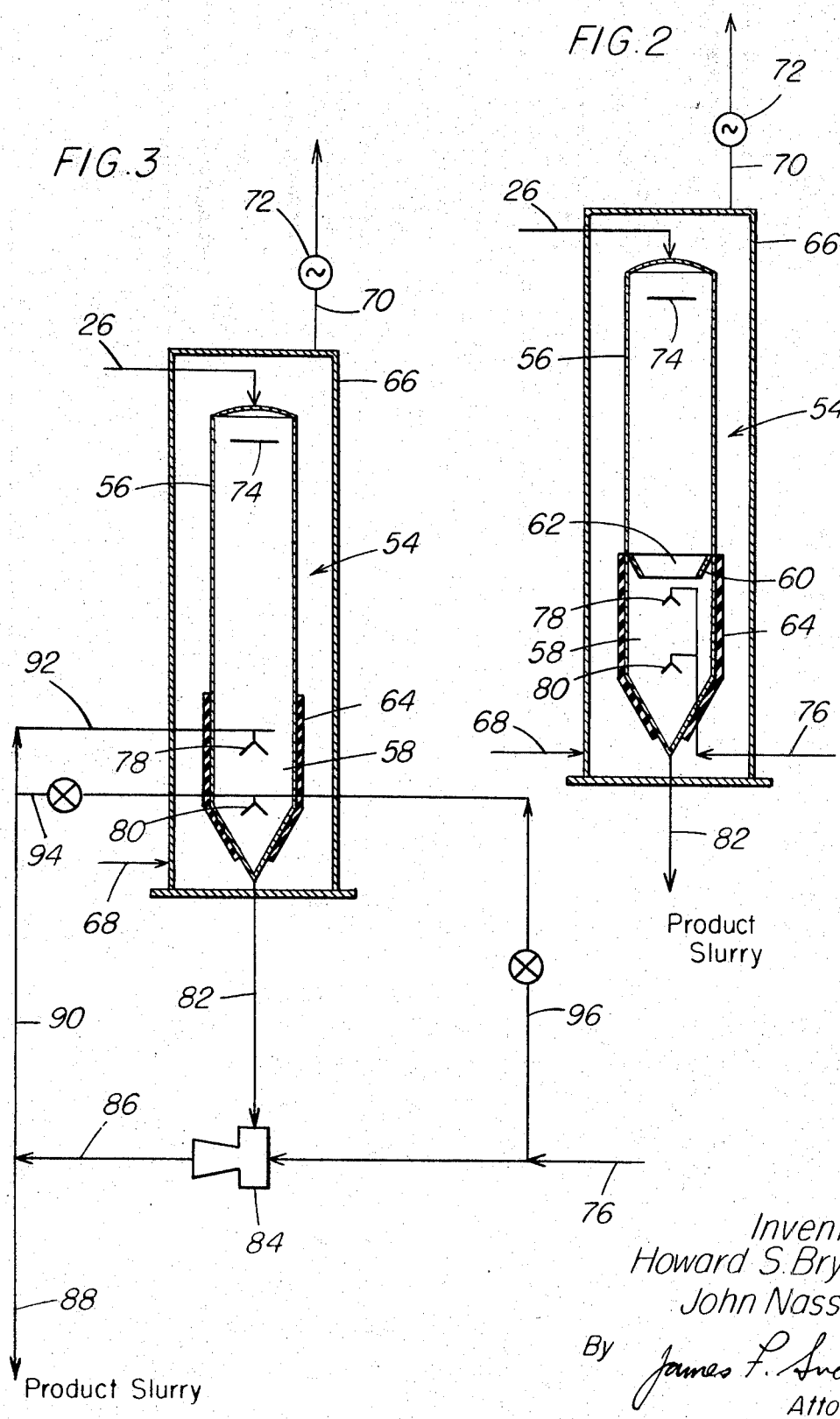

United States Patent Office 3,549,695
Patented Dec. 22, 1970

3,549,695
METHOD FOR DOWNFLOW LEACHING
Howard S. Bryant, Jr., New York, N.Y., and John Nasser, New Canaan, Conn., assignors to Mobil Oil Corporation, a corporation of New York
Filed Sept. 1, 1966, Ser. No. 576,765
Int. Cl. C07c 51/42
U.S. Cl. 260—525                             11 Claims

ABSTRACT OF THE DISCLOSURE

This invention relates to a purification process for leaching a slurry or suspension of small particles of an impure solid material while the entire slurry is continuously flowing downward through a substantially vertical channel or column, as well as the combination thereof with a subsequent recrystallization step and apparatus for leaching and recrystallizing such materials. In a particular embodiment, it is concerned with the treatment of crude terephthalic acid with acetic acid as the leaching agent.

---

Certain features or techniques disclosed herein for the purpose of fully illustrating various aspects of the instant invention are also disclosed and claimed per se in the copending applications Ser. No. 576,724 filed on Sept. 1, 1966 by Griffith et al., Ser. No. 576,764 filed on Sept. 1, 1966 by Nasser and Ser. No. 576,753 filed on Sept. 1, 1966 by Mauldin. Some of the aforesaid features are claimed herein as novel combinations in conjunction with one or more teachings of the present invention.

Leaching is a method for the purification of crude solid material of various sizes in which a substantial amount of the impurities associated therewith are removed by dissolving them in an appropriate liquid agent or solvent at a suitable temperature. Some but not all of the desired substance is usually dissolved also, and this is beneficial in removing part or all of the outer layers of the particles so that the leaching agent can reach and dissolve occluded foreign matter. Although it is an extremely simple operation in theory and in batch operations in the laboratory, many problems are encountered in leaching on a commercial scale, especially in connection with continuous operations. For instance, even small particles tend to settle and plug equipment unless the slurry is subjected to constant agitation; also the liquid component of the slurry is usually a saturated solution which tends to "plate" or form solid deposits on any cold spots in the equipment. The problems are intensified by one or more of such factors as corrosive leaching agents, high pressures, high temperatures, the treatment of abrasive solids and interruptions in the continuous flow of the slurry through the system.

In the production of polyesters, such as polyethyleneglycol terephthalate, for certain uses as in films, fibers and the base for magnetic sound tapes, polymeric material of extremely high purity is essential in obtaining the necessary physical properties of high tensile strength, dimensional stability, etc. in the final product. In turn, this means that the raw materials employed in preparing the polymers must also have extremely low contents of impurities.

Typical commercial specifications for terephthalic acid require that the content of lower oxidation products therein, be kept below about 300 parts per million (hereinafter p.p.m.) by weight and there is an increasing demand for a grade of terephthalic acid containing less than 75 p.p.m. of such impurities of which no more than 50 p.p.m. may be para-carboxybenzaldehyde. Further, only a very small amount of color body impurities is acceptable in certain uses. Such purity requirements are not easy to meet inasmuch as the crude terephthalic acid crystals separated from the products of the partial oxidation of a relatively pure para-xylene, even under carefully controlled oxidation conditions, frequently contain up to about 5% of lower oxidation products, principally p-carboxybenzaldehyde and p-toluic acid. These impurities are difficult to remove since they display a pronounced tendency to be occluded inside the crystals of terephthalic acid.

The instant leach-recrystallization process is suitable for reducing the content of such impurities by at least 65% by weight, and in operating under preferred conditions, it is possible to obtain reductions of 80 to 90% or more in the case of both p-carboxybenzaldehyde and p-toluic acid; also determinations by the American Public Health Association method in both sulfuric acid and dimethylformamide indicate very sizable decreases in the content of color body impurities. Still higher degrees of purification are obtainable by subjecting the recrystallized product to repetitions of this process with a fresh solvent medium and/or to other purification techniques which may include sublimation.

The present invention concerns an improved process and apparatus for the continuous leaching of a slurry of relatively small particles of an impure solid material suspended in a leaching solvent medium while said slurry or suspension is flowing downward through a substantially vertical confined channel at a liquid velocity sufficient to substantially reduce the variation in the residence times in said channel of different sizes of said particles. In general, it is desirable to employ a downward liquid velocity which is high enough to moderate the influence of the different settling rates of different sizes of particles settling within the liquid medium and insure that at least 90% by weight of the solid particles have an actual residence time amounting to more than one-third, and preferably more than one-half, of the nominal or liquid residence time in the leaching zone.

Other aspects of the invention relate to the combination of the aforesaid leaching operation with either or both of a prior step of preheating the charge slurry wherein the slurry is maintained in turbulent flow at a sufficient velocity to avoid any settling of the suspended solids while being heated and a subsequent step of recrystallizing a substantial proportion of the dissolved solids at a substantially lower temperature than employed for leaching. Such recrystallization is preferably accomplished by direct heat transfer with a substantially cooler stream containing the leaching agent, such as product slurry recycled after further cooling. In one embodiment of a substantial volume of the recrystallizing slurry in admixture with said recycled product slurry is recirculated back through the crystallizing zone to provide more gradual cooling of the leached slurry. Specific features of the process include the purification of impure benzene carboxylic acids as exemplified by terephthalic acid especially when it is contaminated with such by-products of the oxidation of p-xylene as p-carboxybenzaldehyde and p-toluic acid; a specified group of solvents, of which acetic acid is preferred; the proportion of the solid content of the charge (e.g., about 10 to 70%) which is dissolved in leaching; as well as appropriate ranges of downward liquid velocities (e.g., at least about 1.5 cm./sec.), slurry proportions, times and temperatures for leaching terephthalic acid and conditions for recrystallizing it.

The instant invention also encompasses novel apparatus for carrying out the aforesaid leaching and recrystallizing operations, including one or more of such features as the preferred arrangement of the recrystallizing chamber beneath and immediately adjoining the leaching chamber, a preferred range of length to diameter ratios for the latter and optionally a partition member between the two chambers. Still other features, as well as the various benefits and advantages of this invention will be apparent to those skilled in the art upon consideration of the detailed disclosure hereinafter.

The present leaching method involves a partial dissolving of the material undergoing purification and solid particles are always present in suspension in the leaching mixture moving downward in a generally vertical direction through an elongated leaching column or chamber without being subjected to mechanical or other extraneous agitation. As the mixture of liquid and dispersed solid particles moves down the leach column in essentially plug flow the solid particles are also settling within the moving liquid under the influence of gravity and thus moving downward at a higher velocity than the body of liquid.

While the nominal leaching residence time is determined by the velocity of the liquid medium down a column of given length and uniform cross-sectional area, the actual residence time of any particular solid particle in said column depends on the total linear velocity of that particle, which is the sum of the downward velocity of the liquid and the settling rate (terminal velocity in a quiescent body of the liquid) of the solid particle within the liquid. Thus, the actual residence times of settling particles are always less than the nominal or liquid residence time. This difference in residence time is relatively unimportant for particles smaller than about 40 microns, but it becomes appreciable with increases in particle size and, there is a significant differential in the case of particles larger than about 150 microns, for such larger particles have markedly higher settling velocities.

Particle sizes are mentioned herein with reference to the size of discrete particles under leaching conditions whether present as individual crystals or aggregates thereof. The terminal or settling velocity for any given size of particle in the selected leaching agent may be calculated with sufficient accuracy for the present purposes from the intermediate settling law equation set forth on page 1019 of the Chemical Engineers' Handbook—John H. Perry, 3rd ed. 1950, McGraw-Hill Book Co., New York. While it may be difficult or sometimes impossible to measure the particle sizes and distribution thereof with exactitude under some operating conditions, this is seldom, if ever, necessary in practicing this invention. For instance, it is usually sufficient to estimate the maximum particle size of the smaller 90% by weight of the particles from the characteristics of the cold slurry charge or even from information on the particle size distribution in the product slurry as a basis for determining the maximum settling rate encountered in leaching a predominant portion of the solid material and consequently the necessary liquid velocity down the column. It is possible to obtain the benefits resulting from the simple operation and absence of mechanical agitaiton and still have relatively uniform residence times for a predominate proportion of the solid material by providing a downward liquid velocity equal to at least half of the maximum undisturbed settling velocity in said slurry of 90% by weight of said suspended solid particles, and a liquid velocity at least about equal to said settling velocity is better still. This means that at least 90% of the undissolved solid material will have a residence time greater than one-third of the nominal residence time; and with the preferred liquid velocity, those particles will have a residence time at least half of the nominal residence time.

The optimum residence or holding time in the leaching column is dependent on a number of factors including the compositions of the material undergoing purification and the leaching agent, the particle size and solubility of the solid material, the leaching temperature, and probably the concentration of solids. Upon increasing the leaching temperature, the residence time may be decreased and vice-versa. In general the nominal residence time should amount to at least 1 minute and a longer period is often desirable. For leaching terephthalic acid in acetic acid in the temperature range of about 400–580° F., a nominal leaching time of about 1 to 20 minutes is usually desirable in the present process.

While it might be imagined that optimum leaching would be obtained with an extremely high velocity flow down an extremely tall tower of extremely narrow cross section, such an arrangement would generally prove unsuitable for commercial purposes by reason of excessive pumping, construction and material costs. Moreover, a reasonably tall tower of small but substantial cross section can produce substantially equivalent results at much less expense. Such columns are typically, but not necessarily, of cylindrical shape, and appropriate dimensional relationships for all types of elongated chambers for downflow leaching may be based on cylinders and set forth as length:diameter $(L:D)$ ratios between about 5:1 and 50:1, with the range of about 8:1 to 40:1 being preferred.

From a construction standpoint, the most practical equipment for downflow leaching is a vertical column or tower. However, the instant process is operative in channels or columns inclined at substantial angles from the vertical, provided that the slant is not so great that some slurry particles lodge on the wall of the column and accumulate there instead of sliding or tumbling down the wall. In other words, the axis of the column should form an angle with the horizontal plane substantially greater than the angle of repose of the material being leached and this may be defined for the present purposes as a "substantially vertical" column or channel. For illustration, terephthalic acid particles of the type described herein have an angle of repose of 42°. In addition, the column is preferably surrounded by a heating jacket or other suitable means for preventing the development of cold spots (i.e., wall areas of the column having temperatures lower than the leach slurry temperature) that promote the formation of localized crystalline deposits which would necessitate frequent shutdowns for their removal. The entire length of the leaching chamber in the tower is desirably maintained at the predetermined leaching temperature to avoid, or at least minimize, and such deposits and to maintain a constant soaking action during the entire residence time therein.

Although the novel treatment is described in considerable detail hereinafter in connection with the purification of the commercially important terephthalic acid using acetic acid as the preferred solvent medium, it is to be understood that the new method is applicable to the treatment not only of other benzene carboxylic acids, including benzoic, orthophthalic, isophthalic and the isomeric toluic acids, but also of soluble solid substances in general, in appropriate slovent liquids at suitable temperature levels for purifying the crude material. The choice of the solvent will, of course, depend upon the solubility characteristics of the substance being treated and of foreign matter to be removed therefrom, and the selected solvent in turn will largely determine the optimum leaching and recrystallization temperatures.

A solvent medium employed for leaching and recrystallization should be one in which there is a marked difference in solubility of the acid undergoing purification, for example, a three-fold or six-fold, change in solubility over a reasonably small temperature change of 100 or 200° F. This temperature differential should preferably be within a moderately elevated range of temperatures in order that the process may be operated efficiently and economically, and with convenience. For example, temperatures which require either artificial refrigeration for recrystallization or excessively high temperatures of above about 600° F. for leaching are usually not very desirable. Since leaching is a liquid phase operation, the leaching temperature must be lower than the critical temperature of the solvent. The solvent should also be inert, that is not react chemically during leaching or recrystallizing with the purified product to be recovered.

The proportions of solvent and solid material in the charge mixture are determined by the operating conditions within the leaching system wherein the slurry always contains the crystalline substance in two states, namely, as the solute of a solution saturated therewith and as undissolved solid particles or crystals suspended in that solution. The presence of undissolved material at all times in the leach slurry eliminates any possibility of forming a supersaturated solution which might interfere with the recrystallization operation. Therefore, the charge mixture should contain an excessive of the crude substance over the amount which will dissolve in the solvent medium at the leaching temperature. However, there cannot be an unlimited excess of undissolved crystals present in the system for the slurries must be fluid enough to be pumped or otherwise transported at all temperatures encountered in the process. In addition, there are indications that a higher degree of purification is obtainable with less concentrated slurries, but this must be balanced against the extra cost of handling a larger volume of slurry. In any event, the solvent should be present in sufficient amount to dissolve any free or unoccluded foreign matter which is to be removed. As an illustration, the slurry may usually contain about 2 to 32% undissolved solids (preferably above about 5%) based on the total slurry weight, and this corresponds generally to a total concentration of about 3 to 40% (the range of about 8 to 35% being preferred) of the crystalline material in the mixture when leaching terephthalic acid in acetic acid.

In the case of terephthalic acid, acetic acid is the preferred solvent, especially when the acetic acid has a small content of water, since an aqueous acetic acid is the predominant component of the liquid reaction medium in several types of oxidation processes and acetic acid is in fact generated or formed during the reaction when methyl ethyl ketone is present. Accordingly, the use of acetic acid as the leaching and recrystallization solvent simplifies the manufacture of terephthalic acid in regard to the number of agents employed, recovered and stored in carrying out the complete manufacturing process. Suitable solvents include the lower aliphatic monocarboxylic acids containing 2 to 8 carbon atoms as exemplified by propionic, normal butyric, isobutyric, valeric, trimethylacetic, caproic and caprylic acids as well as water, para and other xylenes, N,N-dimethylformamide, N,N-dimethylacetamide, tetrahydrofuran and ketones, such as methyl ethyl ketone and methyl isobutyl ketone. All of these are inert in that they do not react with terephthalic acid, even at high temperatures.

Acetic acid has especially suitable solvent characteristics inasmuch as the solubility of the terephthalic acid in acetic acid is relatively low up to about 375° F. but thereafter increases rapidly so that terephthalic acid is moderately soluble at temperatures in the preferred leaching range of about 420 to 580° F. The lower oxidation products constituting the principal impurities in terephthalic acid produced by oxidation are all considerably more soluble in the acetic acid, thus all, or substantially all, impurities of this nature in the free or unoccluded state are retained in solution while the terephthalic acid recrystallizes.

The instant purification procedure usually involves leaching at an elevated temperature and preheating of the charge slurry is ordinarily desirable to raise the temperature to at least approximately the leaching temperature in order to avoid creating thermally induced current in the downflow leaching operation by charging a cold liquid slurry at the top of a column of hot slurry. The preliminary heating may be carried out in any suitable manner in various types of equipment, as illustrated by heating the slurry while it flows through a tank equipped with an internal heating coil and an agitator to keep the solids in suspension. However, it is generally preferred to preheat the charge slurry while it is passing through an externally fired pipe coil in turbulent flow at a linear velocity sufficient to keep the solid particles in suspension and thus obviate the need for any mechanical agitation. This linear flow velocity should desirably exceed the saltation velocity of the slurry by a reasonable safety factor of 50% or more, for example. The saltation velocity (maximum velocity at which some settling of solids still occurs) is well up within the turbulent flow range and reaches a maximum in horizontal flow. For the present purposes, it is generally not feasible to attempt to compute the saltation velocity which is dependent not only on paricle size and conduit size but also on many complex and interrelated factors, some of which are affected differently by temperature and difficult or impossible to determine with accuracy. However, the saltation velocity can be easily determined by simple experimentation with the selected slurry flowing at room temperature through a horizontal section of the conduit to be used and relying on the safety factor mentioned earlier to take care of any temperature effects.

The novel method is concerned only with slurry leaching wherein the solids undergoing treatment are only partially dissolved, for example, by dissolving about 10 to 70% by weight thereof, in contrast with a recrystallization operation in which the crude material is first dissolved completely except for any insoluble impurities present and then recrystallized at a lower temperature, for the downflow technique produces no significant benefits in the latter type of process. With a slurry of the type under consideration which contains a substantial excess of undissolved solid particles suspended in a saturated leaching solution, initially there is essentially only a dissolving action for a relatively brief period as more of the solid material goes into solution while the slurry temperature gradually rises as the slurry flows through the preheater, and this action continues for a short time in the initial or upper section of the vertical leach column, inasmuch as there is some time lag in the dissolving of solid substances. Then there is an equilibrium or "soaking" action usually for a considerably longer interval in the leach column between crystalline material dissolving and solute recrystallizing with a consequent breaking down of the structure of the original crystals and a reconstitution thereof accompanied by a release of much or all of the foreign matter in the original crystals. In the treatment of terephthalic acid, the p-carboxybenzaldehyde and p-toluic acid impurities are more soluble than terephthalic acid in the hot acetic acid, and they are also present in much lower concentration in the slurry; hence, there is less tendency for them to be occluded again during subsequent recrystallization of the terephthalic acid.

The pressure in the leaching operation, as well as other steps of the present invention, is apparently relatively unimportant except that it should be adequate to preclude substantial vaporization of the liquid phase of the slurry at the chosen leaching and recrystallization temperatures.

While any type of reprecipitation or recrystallization may be utilized in conjunction with the aforesaid leaching operation, the particular recrystallization techniques and apparatus described herein often provide substantial advantages over conventional practice. Recrystallization is conventionally carried out at ambient or relatively low temperatures for convenience in separating the product and obtaining the maximum yield. In general, the recrystallizing temperature should be at least about 50° F. below the leaching temperature; further, it should be low enough to recrystallize at least 60% of the dissolved solute, but preferably not more than about 95% thereof in order to minimize the occlusion of impurities during recrystallization, and the residence time is usually at least one minute and often considerably longer.

Although other temperatures may be utilized here in treating terephthalic acid with acetic acid, it is generally preferable to adopt the technique of the aforesaid application Ser. No. 576,724 of recrystallizing terephthalic acid from the hot leach slurry in one or more stages at relatively high intermediate temperatures (e.g., 285 to 420°) at least about 50° below those employed for leaching (e.g., 400 to 580°) and substantially higher than the subsequent filtration temperature (e.g., 180-220°) to obtain terephthalic acid crystals containing considerably less of the impurities than when the leach slurry is cooled directly to a temperature suitable for filtering or otherwise separating these crystals from the slurry. Subsequent cooling of a slurry recrystallized at the elevated intermediate temperature to the same separation temperature (e.g., 180°) apparently does not significantly reduce the purity of the crystals. The residence time is suitably between about 1 and 20 minutes for the leaching step and between about 1 and 30 minutes for the recrystallizing step in downflow operations.

In certain embodiments of this invention, the recrystallization is also a downflow operation which desirably takes place in a chamber immediately below and adjoining the leaching chamber in the same column. Optionally, there may be a partition or baffle between the leaching and crystallization chambers of a type which is designed to minimize any back flow or churning of the recrystallizing mixture up into the leaching chamber and also to avoid accumulating solid deposits on the baffle. In some cases, it may be desirable to insulate the wall of the crystallizing chamber to minimize the transfer of heat by conduction through the wall and thus preclude creating cold spots which will tend to accumulate crystalline deposits on the wall. Alternatively, a separate crystallizing vessel may be used, in which case it may be desirable or necessary to provide means for mechanical agitation in the absence of the downflow operation described.

A particularly desirable form of cooling to recrystallization temperature especially in the case of the integral down-flow recrystallizing chamber, is the recycling of a cooled product slurry at a temperature of the order of about 150 to 250° F., for example, for direct cooling of the hotter leach slurry in accordance with the teachings of the aforesaid application Ser. No. 576,753; since this eliminates the crystalline deposits which rapidly accumulate on the heat transfer surfaces of cooling coils or on walls of a crystallizing chamber surrounded by a jacket filled with a circulating fluid coolant for cooling indirect heat exchange apparatus employed for cooling the slurry within a temperature range that produces substantial crystallization.

In still another modification of the invention, the recycled product slurry is utilized to recirculate a large volume of the recrystallizing slurry back to the top of the downflow crystallizing chamber to provide a more gradual cooling of the hot leached slurry in admixture with a considerably larger flow of circulating slurry.

Numerous benefits and advantages are obtainable with the present invention, particularly in minimizing or avoiding the use of mechanical agitation in conventional manner for preventing the settling of particles of slurry. The customary agitating devices are a continuing source of difficulties due to the problems of maintaining seals around agitator shafts fluid-tight, especially under severe operating conditions of high temperatures and high pressures in the presence of corrosive liquids. In contrast the present system requires no agitator for the leaching operation, and mechanical agitation may also be dispensed with in the preheating and recrystallizing steps. Also, the accumulation of solids from leaching or recrystallizing slurries on equipment surfaces is minimized or eliminated by means including the orientation of such surfaces, the elimination of cold spots or surfaces in contact with the slurry, and especially the direct cooling with a recycled product slurry. Such deposits are particularly undesirable in reducing heat transfer during indirect cooling and in interrupting normal operations while they are being removed. These factors, as well as the overall simplicity of the novel method and apparatus substantially reduce maintenance problems and shutdowns in operations of this type. In addition, there are indications that improved crystallization occurs when the hot leach slurry is recrystallized in admixture with a large volume of cooler slurry.

For a better understanding of the nature and objects of this invention, reference should be had to the accompanying drawings wherein like reference numerals designate the same devices and to the detailed disclosure hereinafter in which all proportions are set forth in terms of weight and all temperatures as degrees Fahrenheit unless otherwise stated. The drawings are schematic in nature and many conventional accessories in the form of valves, control instruments and other auxiliary equipment have been omitted for greater clarity inasmuch as such devices and their utilization are well known to those skilled in the art.

FIG. 2 is a sectional elevation through the axis of a column provided with integral leaching and crystallizing chambers or compartments according to another embodiment of the invention.

FIG. 3 is a view similar to FIG. 2 of another modification of the invention wherein both leaching and recrystallization are accomplished within a single column.

Figure 1:
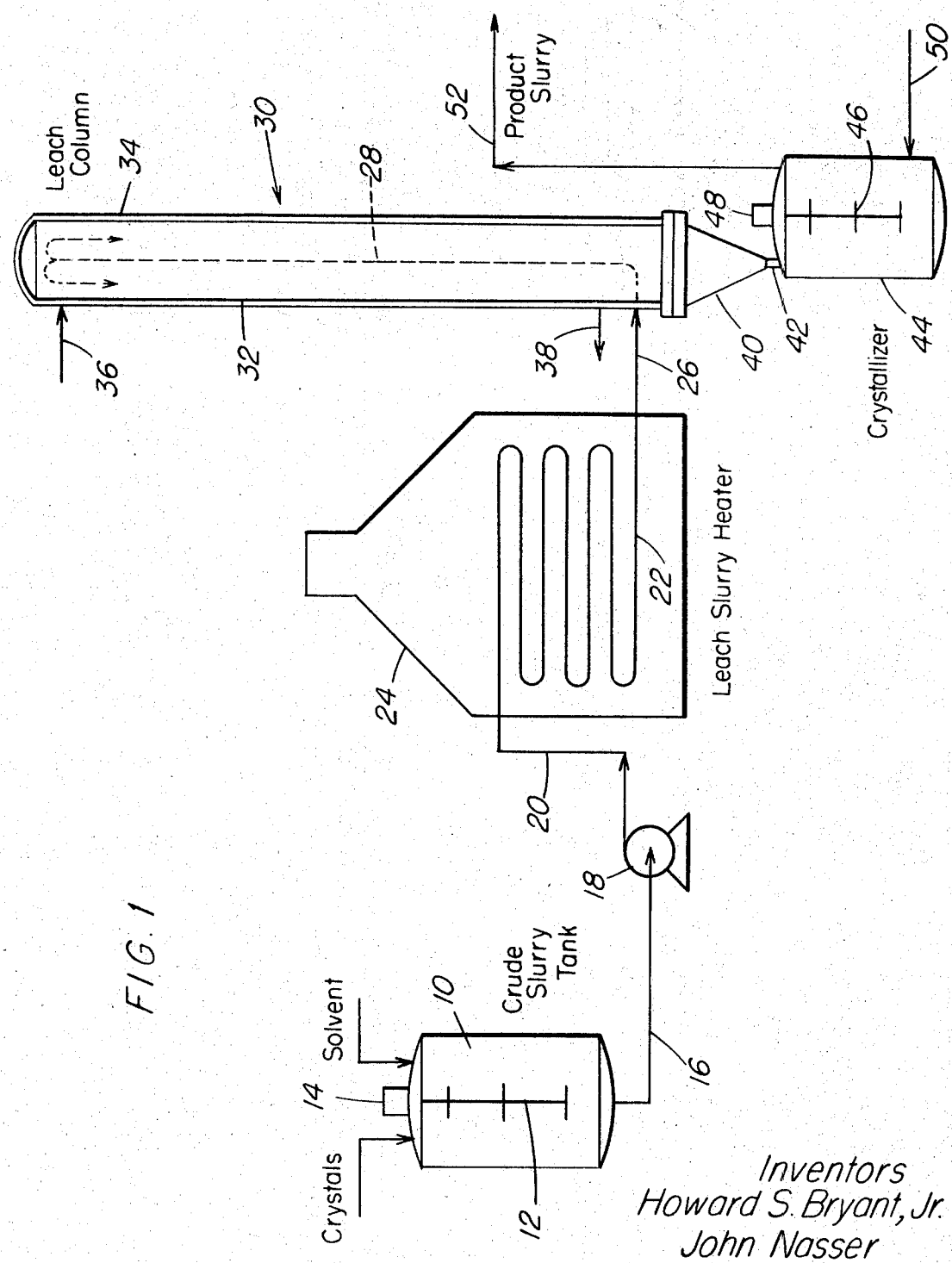
FIG. 1 is a flow sheet of one embodiment of a continuous process according to the present invention employing separate leach and crystallizing vessels.

Turning now to FIG. 1, a crude filter cake of terephthalic acid crystals is charged along with acetic acid to a crude slurry tank 10 wherein the agitator 12 driven by a suitable motor 14 forms a relatively uniform dispersion of about 8 to 20% of the terephtalic acid (e.g., 15% of the total slurry weight) in the liquid. The crude terephthalic acid may be obtained from any suitable source, such as the oxidation of p-xylene according to the procedure disclosed in Ardis et al. Pat. No. 3,036,122. This crude cake often contains 10 to 20% weight of reaction mother liquor consisting mainly of acetic acid, and its approximate dry composition is typically 98% terephthalic acid with 1% p-carboxybenzaldehyde and 1% p-toluic acid as the principal impurities. The leaching solvent is desirably acetic acid containing about 1 to 4% water by weight, and it may be recovered from the aforesaid oxidation process and the instant leaching process by a distillation operation (not shown). Alternatively, the crude terephthalic acid may be leached in its own oxidation reaction mother liquor after separation of the reaction gases, but the product purity is likely to suffer.

The resulting slurry is withdrawn from the bottom of tank 10 in the transfer line 16 and forced by a multistage, slurry pump assembly 18 at about 650 pounds per square inch gage pressure (p.s.i.g.) and ambient or moderately elevated temperature (e.g., 145°) through the transfer line 20 into the heating coil 22 in slurry preheater 24 where the slurry is heated to a temperature of 540° by the combustion of fuel gas. Coil 22 is made up of horizontal lengths of 3-inch I.D. pipe or tubing connected by return bends. The flow through the coil at an initial average slurry velocity of 4.6 feet per second (f.p.s.) produces sufficient turbulence to preclude settling of solids, for it is well above the 1.8 f.p.s. saltation velocity of this slurry in 3-inch tubing at room temperature. Moreover, the velocity increases substantially during passage through the coil for the slurry expands considerably in volume as its temperature rises.

Next, the hot slurry is transported in continuing turbulent flow through a pipe 26 to the central riser 28 and up near the top of the leach tower 30. The transfer line 26 is heated by any suitable means to a temperature slightly above that of the leach slurry to avoid any cold spots which would induce "plating" or the deposition of terephthalic acid in this pipe. Tower 30 contains a closed vessel in the form of an elongated column or inner shell 32 surrounded by a heating jacket 34. A suitable fluid heating medium entering from the inlet or supply line 36 and leaving in the outlet pipe 38 is circulated through the annular space within jacket 34 for the purpose of maintaining the slurry within the column at a constant temperature of 540°.

The bottom section 40 of the tower desirably has a steep conical configuration to eliminate, or at least minimize, the deposition of any solid particles on its wall; and this section may be jacketed and heated similarly to the upper section 32, if necessary or desirable. The slanting wall of the inverted cone 40 should preferably form an angle with the horizontal plane greater than the angle of repose of the solid material being treated so that the particles will tend to slide down the wall rather than lodge thereon. For instance, the angle of repose for terephthalic acid particles of the type described hereinbefore is approximately 42°; hence, the slanting wall is desirably inclined about 55° or more relative to the horizontal.

From the open upper end of the riser 28, the leach slurry flows slowly downward through column 32 and cone 40 and then through the heated inlet connection 42 into the crystallizer 44.

To provide a suitable nominal residence time of six minutes for leaching the terephthalic acid, the tower 30 is designed to have an internal volume equal to six times the volumetric flow per minute of charge slurry introduced through the conduit 26. In one embodiment, the column 156 has a total length of 56 feet and a diameter of only 20 inches so that its $L:D$ ratio is 33.6:1. Under the present leaching conditions, a typical terephthalic acid slurry of the type is believed to contain suspended particles ranging in size from a few microns to 150 microns and larger, with less than 10% by weight of the material falling into the latter category and few, if any, particles larger than about 200 microns. During the nominal 6-minute residence time in this tower, the downward liquid velocity or nominal slurry velocity is 4.82 cm./sec. and the settling velocity or terminal velocity of particles settling in quiescent leaching medium must be added to this liquid velocity in order to determine the actual residence time of particles of a given size. For instance, the settling velocity of particles of 200 micron size is calculated to be 4.33 cm./sec., thereby increasing the overall downward particle velocity to 9.15 cm./sec. and decreasing the actual residence time to 3.1 minutes for particles of this size in tower 156; similarly 150-micron particles settle at 3.14 cm./sec. for a total downward velocity of 7.97 cm./sec. and residence time of 3.6 minutes, and smaller ones of 40-micron size have a computed settling velocity of only 0.67 cm./sec. for a total velocity of 5.49 cm./sec. which results in an actual residence time of 5.2 minutes for these particles. Thus less than 10% by weight of the particles (i.e., those larger than 150 microns) have leaching residence times amounting to less than 60% of the nominal residence time of 6 minutes.

The crystallizing vessel 44 is provided with an agitator 46 driven by a motor 48 for the primary purpose of preventing the suspended particles from settling to the bottom of the tank during a residence time of 22 minutes therein. However, it also serves to maintain a substantially uniform recrystallization temperature throughout the entire body of the slurry in the crystallizer; hence, the incoming slurry is quickly cooled from 540° to 350° for recrystallizing 85 to 90% of the terephthalic acid dissolved in the aqueous acetic acid. The latter temperature is regulated and maintained by the introduction of a relatively cool, product slurry recycled through line 50 from a storage tank (not shown). This slurry coolant is of the same composition, namely, a minor proportion of terephthalic acid suspended in a major proportion of 97% acetic acid leaching solvent, as it has been previously leached in tower 30, recrystallized in vessel 44 and thereafter subjected to further cooling to 180°. The flow rate of the cooler slurry is controlled by a valve or other conventional means (not shown) in this direct heat exchange operation to counteract the heat input from the hot leached slurry from tower 30, with due allowance for heat losses from the crystallizer 44, and thus maintain a steady recrystallization temperature. A significant advantage of employing a direct fluid coolant for recrystallization is that it obviates the need for indirect cooling equipment in a location where the heat transfer surfaces of such apparatus are subject to rapid fouling by the deposition of crystallizing solids.

The recrystallization product slurry is withdrawn through the overhead line 52 for recovery of the crystalline material or further purification depending upon the desired degree of product purity. The preheater, leaching and recrystallizing units of the process described are all operating at temperatures considerably above the atmospheric boiling point of acetic acid; therefore all of these units are maintained under elevated pressures above about 550 p.s.i.g. by means of a conventional pressure control valve (not shown) in line 52 to keep the acetic acid in the liquid state.

Various pieces of equipment which are exposed to acetic or similar aliphatic acids at temperatures above about 300° are preferably constructed of titanium or clad or lined with this metal or other material of similar corrosion and heat resistance in order to avoid contaminating the product with metallic corrosion products. For operating temperatures below 300°, a chromium-nickel stainless steel of the 18-8 type may be used as it provides suitable corrosion resistance at a lower equipment cost.

In FIG. 2 is illustrated another embodiment of the invention in which the leaching and recrystallizing operations take place in a single elongated column. The tower 54 has an upper leach section 56 and a lower recrystallization section 58 separated by a truncated conical baffle 60 in an inverted position with its narrow end 62 lower than its wide end. In addition, the wall of the crystallization chamber 58 is surrounded by a layer of insulation 64 to minimize the transmission of heat through the wall in that zone.

The entire column 54, or at least the upper leach chamber 56, is enclosed within a cylindrical housing 66 through which flue gas or another suitable fluid heating medium at a moderately elevated temperature of 625° is passed from the inlet line 68 around the exterior of the column 54 and out the exhaust line 70 in order to maintain the leaching section at a constant temperature with no cooling of the leaching chamber wall, which would promote a rapid buildup of crystalline deposits thereon. The preheater 24 (FIG. 1) is a suitable source of such flue gas and this hot gas may be blended with an appropriate proportion of air at ambient temperature if necessary for moderating the flue gas temperature. An exhaust fan or blower 72 may desirably be attached to the exhaust line 70 to induce an adequate draft through the enclosure 66.

In this modification of the present process, the preheated terephthalic acid slurry enters the leach-crystallizer at a pressure of about 640 p.s.i.g. and temperature of 540° through line 26 which has its open end directed at the horizontal distributing plate 74 located near the top of the tower and supported on suitable brackets (not shown). Upon striking this plate, the incoming slurry is distributed widely over the circular cross section of the cylindrical column 54, thereby minimizing any tendency toward creating an undesirable narrow axial flow down the center of the tower. The leach slurry moves down the elongated leach section in essentially plug flow as described in connection with the process of FIG. 1 at a liquid velocity of 3.16 cm./sec. in order to provide a nominal residence time of six minutes in this 38-foot long section of the tower which has an internal diameter of 4.5 feet and an $L:D$ ratio of 8.4:1.

From the bottom of leaching chamber 56 the slurry descends into the adjoining crystallizing section 58 through the central opening 62 in the conical baffle 60. Cooling for recrystallization in section 58 is accomplished by recycling relatively cool product slurry through line 76 and one or more distributing devices 78 and 80 located inside the crystallizing chamber. If desired, a distributor may be located in the annular space under baffle 60 and between it and the side wall of the crystallizing compartment.

The rate of recycling product slurry at 225° to the recrystallizing section is correlated with respect to the downward flow through the baffle 60 of the leach slurry at 540° to provide a mixture of the slurries with an average temperature of 350° in the lower half of the crystallizing compartment 58. Under these conditions the recycle slurry flow amounts to 1.5 pounds per pound of hot leach slurry introduced into the crystallizer.

The layer of insulation 64 around the wall of the crystallizing section 58 minimizes heat transfer to the mixture from the surrounding flue gas in enclosure 66, and the bottom of section 58 as well as the baffle 60 are desirably in the form of steep cones, as described in connection with bottom section 40 (FIG. 1) to substantially eliminate the deposition of crystalline material thereon.

There is little or no tendency toward backflow or churning of the recrystallizing mixture into the leaching section 56 of the tower by reason of the greater density of the cooler crystallizing mixture, the restricted opening 62 and orientation of baffle 60 as a downwardly directed funnel. The diameter of 4.5 feet and height of 33 feet of the crystallizing section 58 are correlated with the rates of flow of the two slurries therethrough to provide a residence time of about 2.1 minutes for the freshly leached slurry. The leached and recrystallized slurry is then withdrawn through the bottom line 82 at a temperature of 350° and a pressure of 600 p.s.i.g. and subjected to crystal recovery or further processing as indicated hereinbefore.

In addition to its simple construction and operation, this version of the invention requires no mechanical agitation to keep the solid content of the slurry in suspension during the entire sequence of preheating, leaching and recrystallizing operations.

The process of FIG. 3 is the same as that of FIG. 2 in respect to the leaching step and the use of a single tower. However a much larger volume of cooling slurry is introduced into the crystallizing chamber 58 and the partition baffle between the two zones in the column is omitted. Here, all or a substantial proportion of the product slurry recycled from line 76 as a direct coolant is mixed with recrystallizing slurry leaving the crystallizing chamber; then the resulting mixture is split into two streams, one of which is recirculated to the crystallizing zone for cooling it while the other is withdrawn as the recrystallized product.

In this process modification, the product slurry recycled at 225° from the source described earlier through pipe 76 passes through the nozzle of the aspirator or jet eductor 84 at high velocity creating a suction which draws recrystallizing slurry from the tower bottom line 82 into the eductor at a volumetric flow rate about six times that of the recycle slurry in pipe 76. The two slurry streams are rapidly and thoroughly mixed in the eductor and the line 86 and this is the final cooling and recrystallizing stage for the temperature of the intermingled slurries is 350°. The slurry stream leaving pipe 86 is divided between two branch lines with approximately 40% being taken off in line 88 as the leached and recrystallized slurry product while the remaining 60% is recirculated to the crystallizing chamber 58 through pipe 90. All of the stream in line 90 may be delivered via pipe 92 to the distributing device 78 which is located near the top of the crystallizing section 58 or a portion of the stream may be diverted through line 94 to the lower distributor 80 to provide somewhat more gradual cooling of the recrystallizing slurry.

It is also contemplated that it may be desirable in certain instances to produce a somewhat lower temperature in the lower part of the crystallizing section 58 of the column by delivering a portion of the recycle slurry coolant in line 76 directly to the lower distributing device 80 while the balance of the flow continues to energize the eductor 84. This may be readily accomplished by opening the valve in the branch pipe 96 and closing the valve in line 94.

In the operation of the process of FIG. 3, leaching is the same as described earlier with the leach slurry reaching the open upper end of the crystallizing zone 58 at a temperature of 540°. Then it is subjected to milder direct cooling by mingling with the recirculating slurry from the distributing apparatus in one, two or more stages in a total flow about four times as large and at a higher temperature than in the case of the process of FIG. 2. Recrystallization of the terephthalic acid in solution commences and continues as the slurry mixture flows down through the crystallizing section and out the bottom line 82 at a temperature exceeding 350°. The slurry is subjected to the final cooling stage of this recrystallization upon mixing in eductor 84 and conduit 86 with the cooler recycle slurry from pipe 76 which drops the overall slurry temperature to 350°.

Although the velocity of flow down the crystallizing section 58 of the tower is considerably faster here than in the process of FIG. 2, the residence time is essentially the same as a result of the return flow through pipe 90. The rate of withdrawing product slurry in lines 88 and 82 in these processes is equal on a weight basis to the sum of the rates of introducing charge slurry in line 26 and recycle slurry as a coolant from pipe 76.

While it is contemplated that a slurry pump may be substituted for the eductor 84, this is less desirable in cases where the pump is likely to require considerable maintenance as in operating at high pressures, high temperatures and with corrosive solvents.

The "plating" or deposition of crystalline matter on equipment surfaces is most likely to occur in the crystallization zone and any such undesirable tendency should be substantially minimized both by the relatively high circulation rate therein and by the gentle cooling of the slurry in several stages.

The processes of FIGS. 2 and 3, particularly the latter, are considered to provide relatively mild crystallization conditions in which a relatively short residence time is equivalent to a far longer residence time in conventional recrystallization operations, for the slurry undergoing recrystallization is mingled with a large volume of coolant slurry so that there is no substantial degree of supersaturation of the large body of slurry, whereas equally quick cooling of a slurry without such "dilution" is thought to create a considerable degree of supersaturation that produces rapid recrystallization and occlusion of a high proportion of the original impurities in the recrystallized product.

While the present invention has been described hereinabove in connection with only a few specific embodiments of suitable apparatus and continuous operations employing the same crystalline material in the same solvent medium for simplicity and to facilitate better comparison, it will be apparent to those skilled in the art, that there will be many other possible modifications which may involve other forms of equipment, the purification of other solid substances of a soluble nature, the use of different solvents, other temperatures and recirculation ratios, etc. Accordingly, this invention should not be construed as limited in any particulars except as set forth in the appended claims or required by the prior art.

We claim:
1. A process for purifying an impure solid benzene carboxylic acid containing an aldehyde which comprises continuously leaching a slurry of said impure solid material suspended in a leaching solvent medium for a sufficient period of time to dissolve a substantial proportion of said aldehyde while said slurry is continuously flowing downward through a substantially vertical confined channel at a liquid velocity sufficient to substantially reduce the variation in the residence times in said channel of particles of different sizes.

2. A process according to claim 1 in which said material is impure terephthalic acid.

3. A process according to claim 1 in which said material is a crude terephthalic acid containing small proportions of p-carboxybenzaldehyde and p-toluic acid, said leaching medium contains a suitable solvent for said three compounds, and the quantity of said medium is sufficient to dissolve all free p-carboxybenzaldehyde and p-toluic acid together with between about 10 and 70% by weight of the terephthalic acid present.

4. A process according to claim 1 in which impure terephthalic acid is leached at a temperature between about 400 and 580° F. for a nominal residence time between about 1 and 20 minutes in a solvent of the group consisting of water, aliphatic monocarboxylic acids containing from 2 to 8 carbon atoms, ketones, p-xylene, tetrahydrofuran, dimethylformamide and dimethylacetamide.

5. A process according to claim 1 in which impure terephthalic acid is leached in a solvent medium comprising at least a major proportion of acetic acid at a temperature between about 400 and 580° F. for a nominal residence time between about 1 and 20 minutes while flowing downward at a liquid velocity of at least about 1.5 centimeters per second as a slurry containing between about 2 and 32% undissolved terephthalic acid based on the total slurry weight.

6. A process according to claim 1 in which said slurry charge for leaching is preheated to an elevated leaching temperature by passage in turbulent flow at a velocity sufficient to maintain said small particles of impure solid material in suspension through a heated conduit of substantially smaller cross-sectional area than said confined leaching channel in order to maintain said solid particles in suspension throughout said heating and leaching steps without employing mechanical agitation.

7. A process according to claim 6 in which a crude terephthalic acid containing small proportions of p-carboxybenzaldehyde and p-toluic acid is heated in acetic acid to a leaching temperature in the range of about 400 to 580° F., leached as a slurry containing a total of about 8 to 35% of terephthalic acid based on the total slurry weight at a substantially constant temperature in said range for a nominal residence time between about 1 and 20 minutes and thereafter recrystallized during a period of about 1 to 30 minutes at a temperature at least 50° F. lower than said leaching temperature and within the range of about 285 and 420° F. to produce purer terephthalic acid crystals.

8. A process according to claim 1 in which said leached slurry contains a substantial amount of said solid material in solution at an elevated leaching temperature and a substantial proportion of said dissolved material is thereafter recrystallized from said leaching medium at a substantially lower temperature in admixture with a substantially cooler stream containing said leaching medium while flowing downward through a substantially vertical confined channel, whereby undissolved small solid particles are maintained in suspension without mechanical agitation during said leaching and recrystallizing steps.

9. A process according to claim 8 in which said recrystallization occurs in a zone immediately below and adjoining the zone in which said leaching occurs.

10. A process according to claim 8 in which said recrystallized slurry is withdrawn from said channel, cooled further by admixture with a colder stream of recycled product slurry and a portion of said mixed slurries is recirculated to said recrystallizing operation in said channel to cool said leach slurry while another portion of said mixed slurries is withdrawn as the leached and recrystallized product of said process.

11. A process according to claim 8 in which said slurry charge for leaching is preheated to said elevated leaching temperature by passage in turbulent flow at a velocity sufficient to maintain said small particles of impure solid material in suspension through a heated conduit of substantially smaller cross-sectional area than said confined leaching channel in order to maintain said solid particles in suspension throughout said preheating, leaching and recrystallizing steps in the absence of mechanical agitation.

References Cited
UNITED STATES PATENTS 3,171,856   3/1965   Kurtz _____ 260—525

FOREIGN PATENTS 557,996   5/1958   Canada _____ 260—525

OTHER REFERENCES

Weissberger, Laboratory Engineering, 1957, p. 157.

LORRAINE A. WEINBERGER, Primary Examiner

R. S. WEISSBERG, Assistant Examiner

U.S. Cl. X.R.

23—267